Sept. 7, 1926.  1,599,218
M. S. DOUGHERTY
WINDSHIELD ADJUSTING DEVICE
Filed Oct. 13, 1925   3 Sheets-Sheet 1
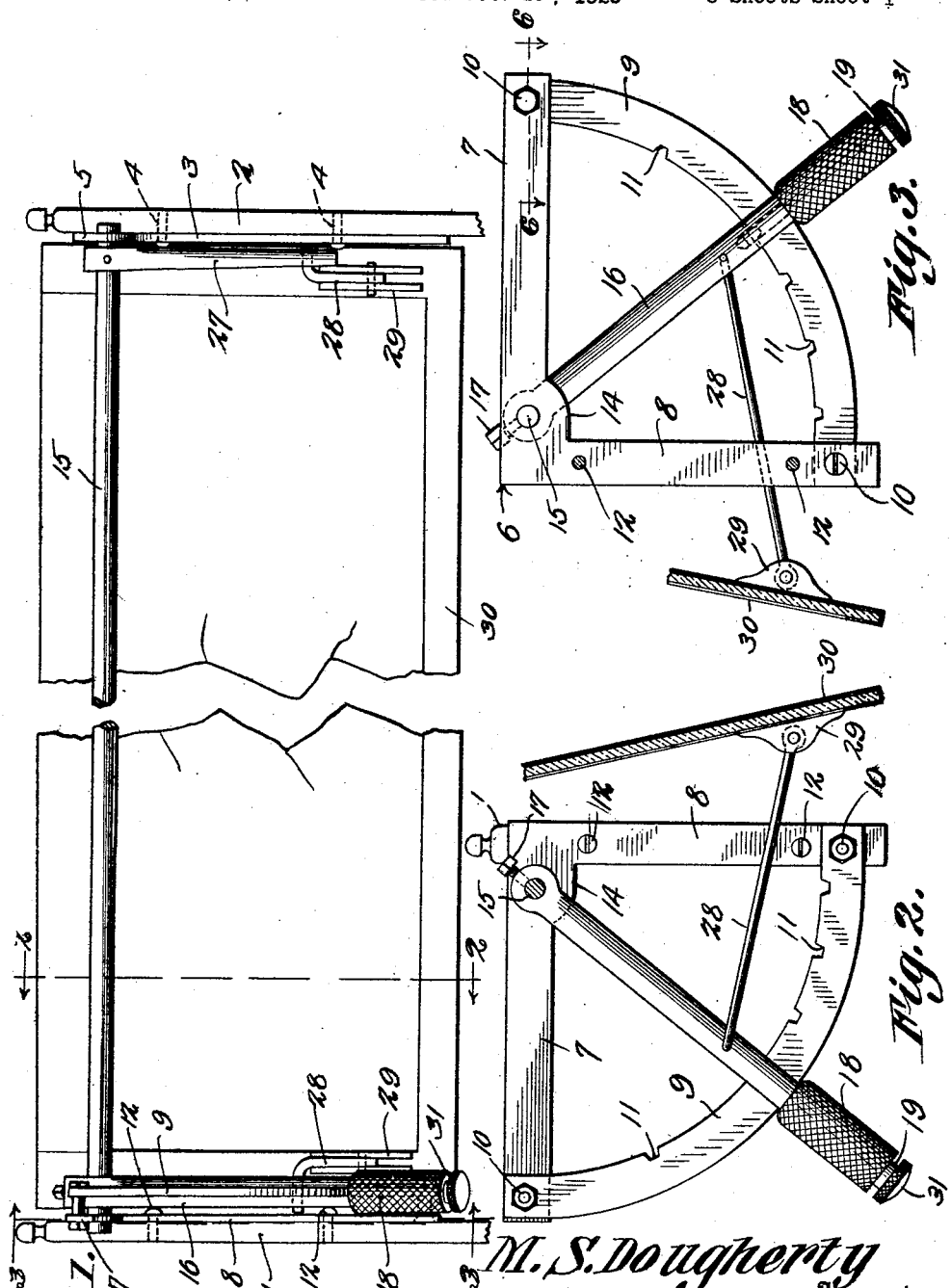
M. S. Dougherty
Inventor,
By C. A. Snow & Co.
Attorneys.

Sept. 7, 1926.　　　　　M. S. DOUGHERTY　　　　　1,599,218
WINDSHIELD ADJUSTING DEVICE
Filed Oct. 13, 1925　　　3 Sheets-Sheet 2
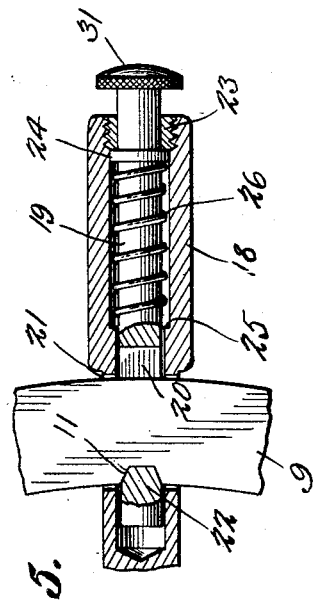
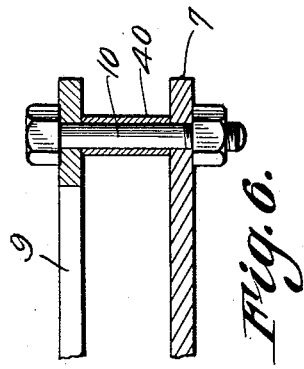
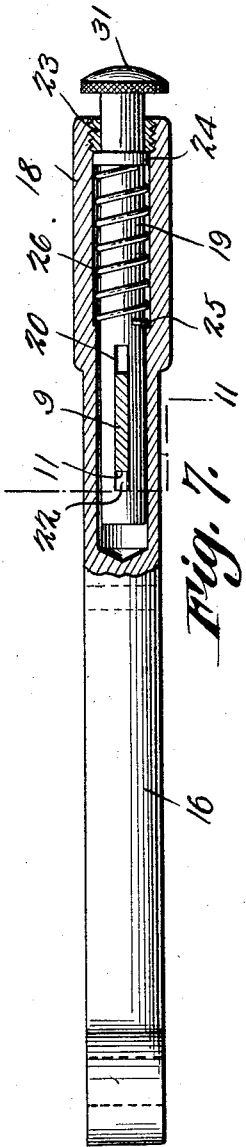
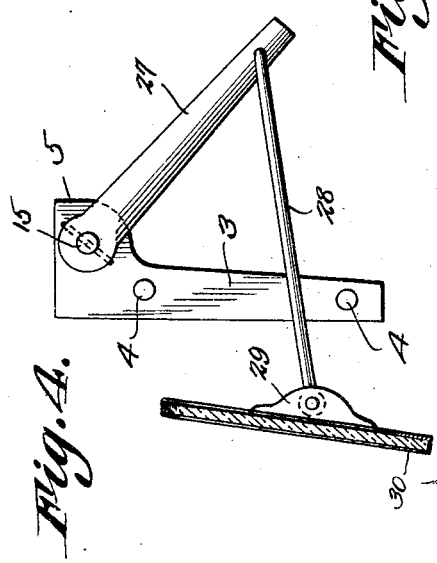
M. S. Dougherty
Inventor,
By C. A. Snow & Co.
Attorneys.

Sept. 7, 1926.  1,599,218
M. S. DOUGHERTY
WINDSHIELD ADJUSTING DEVICE
Filed Oct. 13, 1925  3 Sheets-Sheet 3
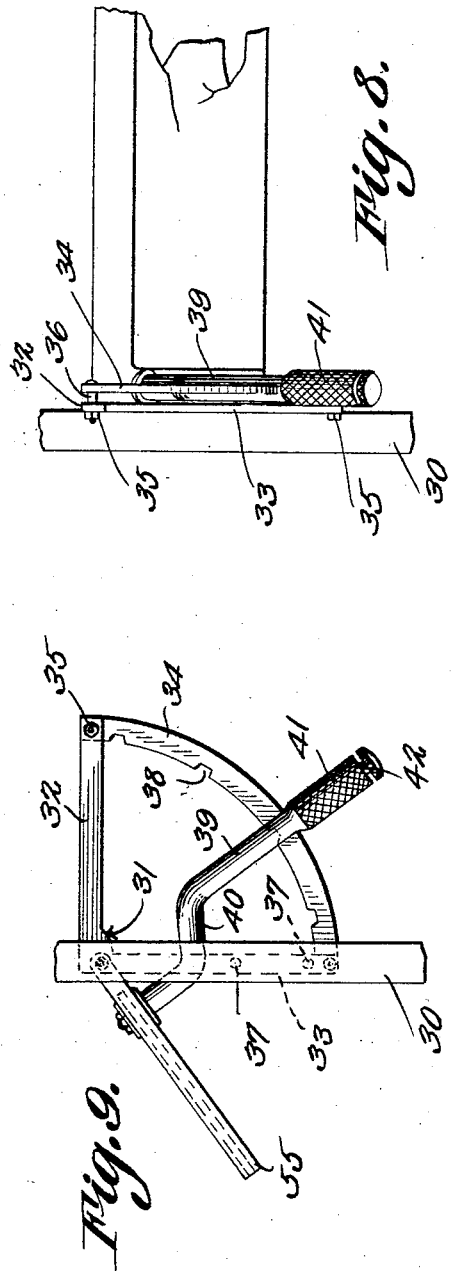
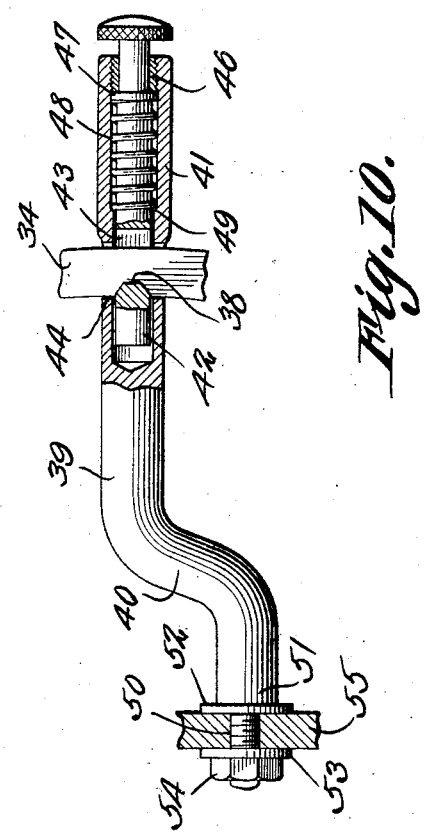
M. S. Dougherty
Inventor Patented Sept. 7, 1926.

1,599,218

UNITED STATES PATENT OFFICE.

MALCOLM STEWART DOUGHERTY, OF LINDSAY, LOUISIANA.

WINDSHIELD-ADJUSTING DEVICE.

Application filed October 13, 1925. Serial No. 62,291.

This invention aims to provide a novel means whereby a windshield, or a panel, or part of a windshield, such as employed on an automobile, motor boat, or any other vehicle of transportation, whether on land, water or air, may be opened or shut, or held opened, or partly opened, or shut, almost instantaneously, without the inconvenience of loosening, or tightening any binding nuts, set screws, tangent screws, or any other clamping devices.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in front elevation, a device constructed in accordance with the invention, parts being broken away; Figures 2 and 3 are elevations showing a portion of the operating mechanism for the windshield panel; Figure 4 is an elevation showing another portion of the operating mechanism for the panel; Figure 5 is a sectional view showing the handle of the lever and the segment; Figure 6 is a section taken about on the line 6—6 of Figure 3; Figure 7 is an elevation of the lever or handle, parts being in section; Figure 8 is a fragmental elevation showing a modification; Figure 9 is an end elevation of the structure shown in Figure 8; Figure 10 is an elevation of the handle or arm, parts being in section. Figure 11 is a cross section on the line 11—11 of Figure 7.

In carrying out the invention, there is provided a support, which may be the windshield posts 1 and 2 of a motor vehicle. The numeral 3 designates a bearing, in the form of a strip, secured at 4 to the windshield post 2 and provided at its upper end with a rearwardly extended projection 5.

The numeral 6 designates an angular bearing or bracket including a horizontal arm 7 and a vertical arm 8 disposed at right angles to each other. A segment 9 is provided and is connected at its ends by bolts 10 and spacing sleeves 40, with the arms 7 and 8 of the bearing or bracket 6. In the inner edge of the segment 9, seats 11 are formed. The vertical arm 8 of the bracket 6 is secured at 12 to the post 1, the arm 7 extending rearwardly. At the place where the arms 7 and 8 of the bracket 6 join there is an enlargement 14.

A horizontal shaft 15 is journaled in the enlargement 14 of the bearing bracket 6 and in the part 5 of the bearing strip 3. An arm 16 is secured to the shaft 15 as shown at 17, and is located adjacent to the windshield post 1. The arm 16 has a hollow handle 18 wherein a latch rod 19 is mounted for rightline reciprocation, the latch rod having a slot 20 cooperating with a slot 21 in the arm 16, the segment 9 extending through the slots 20 and 21. A tooth 22 is formed in the latch rod 19 at one end of the slot 20 and is adapted to cooperate with the seats 11 of the segment 9. The latch rod 19 slides in a bearing 23 threaded into the outer end of the handle 18, the latch rod having a shoulder 24 adapted to abut against the bearing 23, under the action of a compression spring 26 disposed in the handle 18, about the rod, one end of the spring engaging the shoulder 24 of the latch rod, and the other end of the spring engaging an internal shoulder 25 formed in the handle 18. The function of the spring 26 is to maintain the tooth 22 of the latch rod 19 yieldably engaged in any one of the seats 11 in the segment 9. An arm 27 is secured to the shaft 15 and is located adjacent to the post 2. Links 28 are provided. The rear ends of the links are mounted pivotally in the arms 16 and 27, the forward ends of the links being mounted pivotally in bearings 29 of the panel 30 of the windshield, which, as usual, is supported for swinging movement. The latch rod 19 is provided at its outer end with a button 31.

In practical operation, the operator slides the latch rod 19 inwardly, by pressing on the button 31, the spring 26 being compressed, and the tooth 22 on the latch rod being disengaged from the seat 11 in the segment 9. Then, the arm 16 may be swung vertically, rotation being imparted to the shaft 15, and the arms 16 and 27 imparting swinging movement to the windshield pane or panel 30. When the windshield panel has been carried to the desired position, the tooth 22 of the latch rod 19 engages automatically in one of the seats 11 of the segment 9, under the action of the spring 26, when the windshield panel is held, thus, in any position to which it may have been adjusted.

In carrying out the invention as disclosed in Figures 8, 9, and 10, there is provided a support 30, which may be a windshield post. The numeral 31 designates an angular bearing or bracket, including a horizontal arm 32 and a vertical arm 33 disposed at right angles to each other. A segment 34 is provided and is connected at its ends by bolts 35 and spacing sleeves 36 with the arms 32 and 33 of the bearing or bracket 31. In the inner edge of the segment 34, seats 38 are formed. The vertical arm 33 of the bracket 31 is secured at 37 to the support or post 30, the arm 32 extending rearwardly.

The numeral 39 designates an arm located adjacent to the support or post 30. The arm 39 is offset intermediate its ends, as shown at 40, and has a hollow handle 41 wherein a latch rod 42 is mounted for right-line reciprocation, the latch rod having a slot 43 cooperating with a slot 44 in the arm 39. The segment 34 extends through the slots 43 and 44. A tooth 45 is formed in the latch rod 42 at one end of the slot 43 and is adapted to cooperate with the seats 38 of the segment 34. The latch rod 42 slides in a bearing 46 threaded into the outer end of the handle 41, the latch rod having a shoulder 47 adapted to abut against the bearing 46, under the action of a compression spring 48 disposed in the handle 41, about the rod, one end of the spring 48 engaging an internal shoulder 49 formed in the handle 41. The function of the spring 48 is maintained in any one of the seats 38 in the segment 34. The arm 39 has a reduced end 50 defining a shoulder 51 against which abuts a washer 52 cooperating with a washer 53 held in place by a nut 54 on the reduced end 50 of the arm 39, the reduced end of the arm passing through the movably mounted windshield panel, and being held thereon, between the washers 52 and 53, by the nut 54.

When the latch rod 42 is thrust inwardly, the spring 48 is compressed, and the tooth 45 on the latch rod is disengaged from the seat 38 in the segment 34. The windshield panel 55 then may be hung to any desired position by means of the arm 39, and when the pressure on the latch rod 42 is relieved, the spring 48 will react and cause the tooth 45 to engage in one of the seats 38 of the segment 34.

What is claimed is:—

1. In a device of the class described, a support, a bracket comprising arms disposed at an angle to each other, means for securing one arm of the bracket to the support, a segment spaced laterally from the bracket and having a seat in its inner edge, securing devices connecting the ends of the segment with the ends of the arms of the bracket, spacers on the securing devices and located between the segment and the bracket, a hollow handle having an internal shoulder, and provided with a transverse slot, a bearing in the outer end of the handle, a latch slidable in the bearing and having a shoulder adapted to engage the bearing, the latch having a slot registering with the slot of the handle, the latch being provided with a tooth disposed at the inner end of the slot in the latch, the segment being extended through the slots, and the tooth cooperating with the seat of the segment, a compression spring within the handle and located about the latch, the spring being engaged at its ends with the shoulders of the latch and of the handle, a windshield panel mounted to move with respect to the support, and means for connecting the handle with the panel.

2. In a device of the class described, a support, a bracket comprising arms disposed at an angle to each other, means for securing one arm of the bracket to the support, a segment spaced laterally from the bracket and having a seat in its edge, securing devices connecting the ends of the segment with the ends of the arms of the bracket, spacers on the securing devices and located between the segment and the bracket, a handle mounted to move on the segment, a latch movably mounted in the handle and cooperating with the seat of the segment, a windshield panel, mounted to move with respect to the support, and means for connecting the handle with the panel.

3. In a device of the class described, a support, a segment having a seat in its inner edge, means for mounting the segment on the support, a hollow handle having an internal shoulder, and provided with a transverse slot, a bearing in the other end of the handle, a latch slidable in the bearing and having a shoulder adapted to engage the bearing, the latch having a slot registering with the slot of the handle, the latch being provided with a tooth disposed at the inner end of the slot in the latch, the segment being extended through the slots, and the tooth cooperating with the seat of the segment, a compression spring within the handle and being located about the latch, the spring being engaged at its ends with the shoulders of the latch and of the handle, a windshield panel mounted to move with respect to the support, and means for connecting the handle with the panel.

In testimony that I claim the foregoing as my own, I have hereto affixed my signature.

MALCOLM STEWART DOUGHERTY.